United States Patent [19]

Bloink

[11] Patent Number: 4,919,023

[45] Date of Patent: Apr. 24, 1990

[54] QUICK-CHANGE TOOL ADAPTER

[76] Inventor: Harry W. Bloink, 16880 Kinloch, Redford, Mich. 48240

[21] Appl. No.: 171,546

[22] Filed: Mar. 22, 1988

[51] Int. Cl.$^5$ .............................................. B23B 29/20
[52] U.S. Cl. ...................................... 82/160; 279/71; 279/81; 279/1 B; 409/234
[58] Field of Search ...................... 409/231, 232, 234; 279/1 B, 1 L, 1 TE, 1 TS, 71, 81; 82/36 B, 160; 407/34

[56] References Cited

U.S. PATENT DOCUMENTS

| | | |
|---|---|---|
| 2,449,277 | 9/1948 | Cherry ................................. 279/81 |
| 2,696,125 | 12/1954 | Saari . |
| 2,970,844 | 2/1961 | Better . |
| 3,036,319 | 5/1962 | Conner . |
| 3,304,837 | 2/1967 | Perman . |
| 3,762,271 | 10/1973 | Poincenot . |
| 4,061,076 | 12/1977 | Robertson . |
| 4,303,360 | 12/1981 | Cayen et al. . |
| 4,307,797 | 12/1981 | Belansky . |
| 4,350,463 | 9/1982 | Friedline . |
| 4,478,541 | 10/1984 | Okada et al. . |
| 4,536,110 | 8/1985 | Farrell et al. . |
| 4,553,886 | 11/1985 | Vasilchenko et al. . |
| 4,596,502 | 6/1986 | Cattani . |
| 4,597,699 | 7/1986 | Ramunas . |
| 4,626,146 | 12/1986 | Neumaier . |
| 4,632,613 | 12/1986 | Wollermann . |
| 4,632,614 | 12/1986 | Rall et al. ............................. 409/233 |
| 4,655,631 | 4/1987 | Mitchell ......................... 279/1 B X |
| 4,655,655 | 4/1987 | Schurfeld . |
| 4,662,043 | 5/1987 | Stone et al. ......................... 29/33 P |
| 4,688,810 | 8/1987 | Waite ................................ 279/71 X |
| 4,701,083 | 10/1987 | Deutschenbauer et al. . |

FOREIGN PATENT DOCUMENTS 3514192 10/1986 Fed. Rep. of Germany .......... 279/8
0241011 10/1986 Japan .................................. 409/234

Primary Examiner—Z. R. Bilinsky
Attorney, Agent, or Firm—Gifford, Groh, Sprinkle, Patmore and Anderson

[57] ABSTRACT

A quick-change adapter which allows the precise positioning of a working member such as a tool, a workpiece or the like with respect to a machining device has a precision of one or two ten-thousandths of an inch. The adapter includes first and second holders affixed to the working member and the machining device. Each of the first and second holders includes a mating surface, configured as a helical face gear or as a cylindrical stud and recess. A shank extends from the first holder and has a V-shaped notch on which pins on the second holder abut, so as to draw the first and second holder engagement surfaces into firm abutment. The pins are preferably driven by a floating cam ring carried by the second holder, so that positioning of the holders with respect to one another is determined substantially only by the engagement surfaces. Misalignment of the holder due to movement caused by non-axial drawing on the shank is eliminated. Also preferably, the cam surfaces of the cam ring are more sharply cambered in their initial portions, and less cambered as the pins draw on the shank so as to bring the engagement surfaces of the holders into firm abutment, thereby simultaneously increasing the speed of use of the adapter while more positively assuring firm abutment of the engagement surfaces of the holders.

10 Claims, 3 Drawing Sheets

QUICK-CHANGE TOOL ADAPTER

BACKGROUND OF THE INVENTION

I. Field of the Invention

The present invention relates to machine tools, and more particularly to a quick-connect and disconnect means for attaching a working member such as a workpiece, a tool or the like to a machining device such as a lathe, a mill, a grinder, or a multiple-tool turret or head, or for gauging purposes or the like.

II. Description of the Prior Art

Quick-change tool adapters or mounts of various types are well known. For example, it has been known to employ paired tool holders affixed one each to a working member and to a machining device. The holders are then joined by a stem on one of them which is drawn by a draw means on the other, to bring the holders into abutment. The draw means can comprise balls or rollers forced by an axially movable, spring-loaded sleeve into a V-notch or another ramp surface on the stem. At least one past adapter has included a particular mating configuration on the abutting faces of the holders in order to center them by perpendicular movement when they are drawn into engagement with one another.

While these prior adapters have been generally adequate for their intended purpose, there use has entailed some drawbacks. The prior adapters have generally included a draw means which was fixedly mounted to (and thereby maintained in a fixed position relative to) the machining device, so that any axial misalignment of the drawing means and the mating faces meant that the tool holder was either loose, or mounted at an angle, even though the stem was firmly drawn. In either case, the precision of alignment of the working member and the machining device was adversely affected.

Typically, such tool adapters at best possess a precision of about one one-thousandth of an inch. This precision is insufficient for much machining work which needs to be performed today. Also, prior changers have involved complex draw and alignment structures, costly to construct and difficult to maintain and keep clean. This last problem is particularly acute in machine shop environments, where the introduction of oil, abrasive or machined metal powder or particles between the mating faces of the holders is common.

SUMMARY OF THE PRESENT INVENTION

The quick-change tool adapter of the present invention solves these and other drawbacks by providing a means for mounting tools, workpieces or other working members to machining devices such as lathes, mills, grinders and multiple-tool turrets or heads, or on test benches for gauging or the like, while simultaneously substantially increasing the precision of the positioning of the working member with respect to the machining device. The apparatus of the present invention provides a positioning precision of as low as one or two ten-thousandths of an inch.

More particularly, the quick-change tool adapter of the present invention first comprises a pair of holders each having a surface including a portion for engagement with the corresponding portion of the other holder. The adapter also includes a shank on the first holder extending from the surface of the first holder, while the second holder includes a portion defining an aperture through its surface. The shank is dimensioned to be received in the aperture. Draw means are provided on the second holder for drawing on the shank so as to bring the first and second engagement portions of the holders into firm abutment against one another. Of course, either the first or second holder can be affixed to either the working member or and the machining device.

In a first preferred embodiment of the present invention, the invention is additionally characterized by the fact that the first and second engagement portions are configured as helical face gears. Such gears are well known in the art, described in U.S. Pat. No. 2,696,125 (O. E. Saari, Dec. 7, 1954), and have been used in gear couplings or clutches, as described in U.S. Pat. No. 4,307,797 (R. J. Belansky, Dec. 29, 1981). The disclosures of these patents are expressly incorporated by reference herein, to the extent necessary to understand the design and construction of such gears.

In a second preferred embodiment of the present invention, the first engagement portion includes a counterbore or cylindrical recess formed about the shank, and the second engagement portion includes a pilot or cylindrical stud extending from the surface of the second holder. The shank aperture is formed longitudinally through the stud, and a recess in the first holder is dimensioned to very closely receive the cylindrical stud therein, with a close lateral clearance on the order of a few ten-thousandths of an inch. This second embodiment also includes key means preventing rotation of the cylindrical stud with respect to the recess when the shank is drawn by the draw means so that flanges or flat annular shoulders on each of the holders positioned about the recess and stud firmly abut one another when the draw means draws on the shank.

In each embodiment of the present invention the draw means preferably comprises at least three spring-loaded pins carried by the second holder, which can be moved toward a V-shaped notch in a shank by a floating cam ring. The floating cam ring and pins together ensure that alignment of the holders is determined solely by the engageable face portion, and not by any draw means of precisely fixed location. One side of the V-shaped notch provides a ramp surface for drawing the shank. The cam ring is located circumferentially about the pins and aperture in the second holder, and preferably includes a cam surface portion for each of the pins. The individual cam surface portions comprise two smoothly merged segments, the radially outer segment of about 3° camber, and a radially inner segment having about a 1½° camber. A smooth transition location is provided between each of these pairs of segments, approximating a point at which the pins begin to loosely engage the V-notch of the shank. Such a transition location provides the optimum compromise between ensuring a tight and steady abutment of the engagement faces of the holders, and rapid operation of the adapter. The lower cambered inner ramp segment permits greater tightening, while the greater cambered outer ramp segment permits rapid movement of the pins with respect to the shank.

BRIEF DESCRIPTION OF THE DRAWING

A better understanding of the present invention will now be had upon reference to the following detailed description, when read in conjunction with the accompanying drawing, wherein like reference characters refer to like parts throughout the several views, and in which.

DETAILED DESCRIPTION OF THE PREFERRED EMBODIMENT OF THE PRESENT INVENTION

Figure 1:
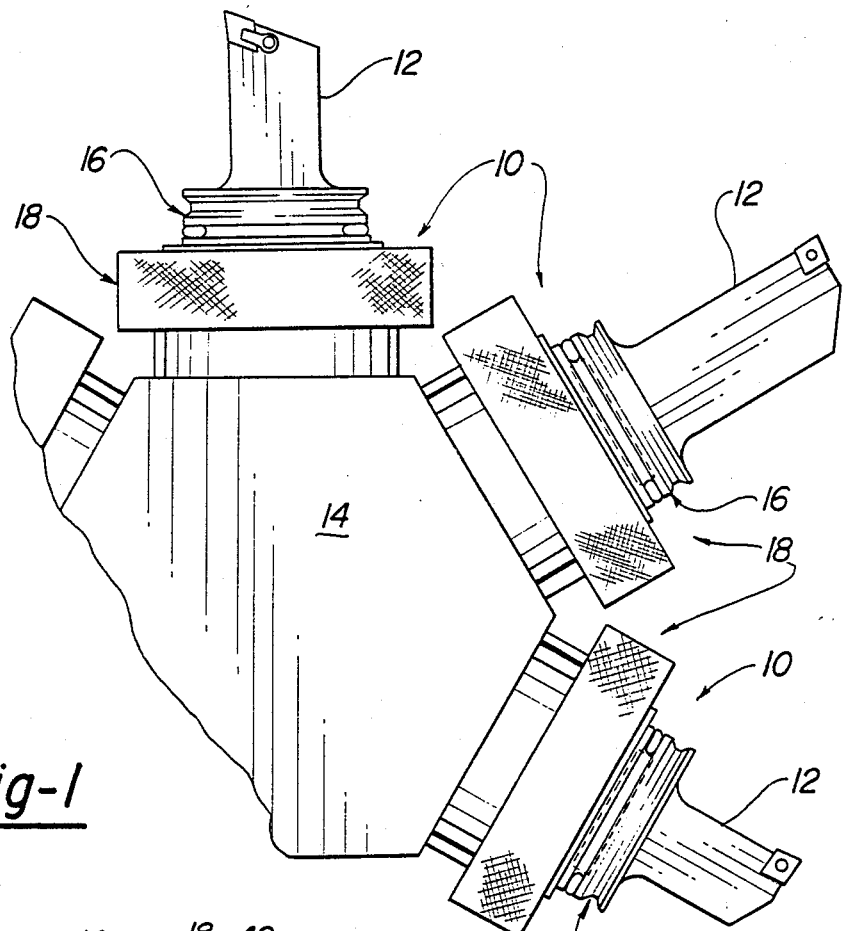
FIG. 1 is a perspective view of the preferred embodiment of the present invention.

With reference first to FIG. 1, a quick-change tool adapter 10 according to the present invention is thereshown for affixing and precisely locating a working member 12 upon a machining device 14. The working member 12 may be one of a series of cutting tools, workpieces, or the like while the machining device may be a grinder, a lathe, a mill, a multiple-head changer, or the like. By way of example only, FIG. 1 discloses a working member 12 which is a cutting tool having a bit thereon, while the machining device 14 is a multiple tool turret having several cutting tools on it.

Figure 6:
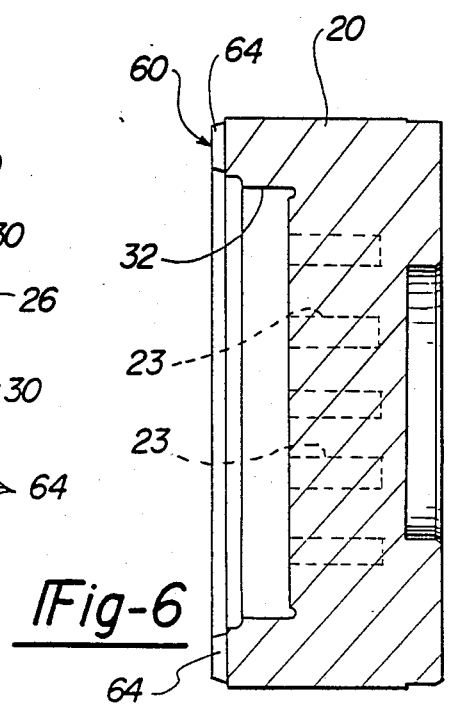
FIG. 6 is a cross-sectional view taken along line 6—6 of FIG. 5.

The adapter 10 of the present invention first comprises a first holder 16 to which either the working member 12 or the machining device 14 is mounted. The former probably is more economical to provide, and so is illustrated for example here. The adapter 10 also comprises a second holder 18 connected to the other of the machining device 14 and the working member 12. As more particularly shown in FIG. 2, the first holder 16 includes a slave adapter 20 (shown more clearly by itself in cross-section in FIG. 6). The slave adapter 20 is attached to the working member 12 by a plurality of taper-headed bolts 22 embedded in or mounted to the working member 12, and passing through bores 23 in the slave adapter 20. A matching plurality of nuts 24 are tightened on the bolts 22 to attach the working member 12 to the slave adapter 20.

The first holder 16 also includes a plate 26 attached by a plurality of bolts 28 located in threaded holes 30 in the slave adapter 20. The plate 26 includes recesses 32 which lie over the nuts 24, as well as a shank 34 integrally formed therewith. The shank 34 includes a ramp surface 36 preferably formed as one side of a V-shaped notch 38. The ramp surface 36 tapers radially inwardly along the shank 34 in a direction from a free end 37 of the shank and towards the plate 26.

Of course, the first holder 16 can be of simpler construction, such as by using only a single bolt to fix either or both of the working member 12 and the shank 34 to the slave adapter 20. Indeed the shank 34 can be integrally formed with the slave adapter 20, thereby providing a unitary holder 16.

Figure 3:
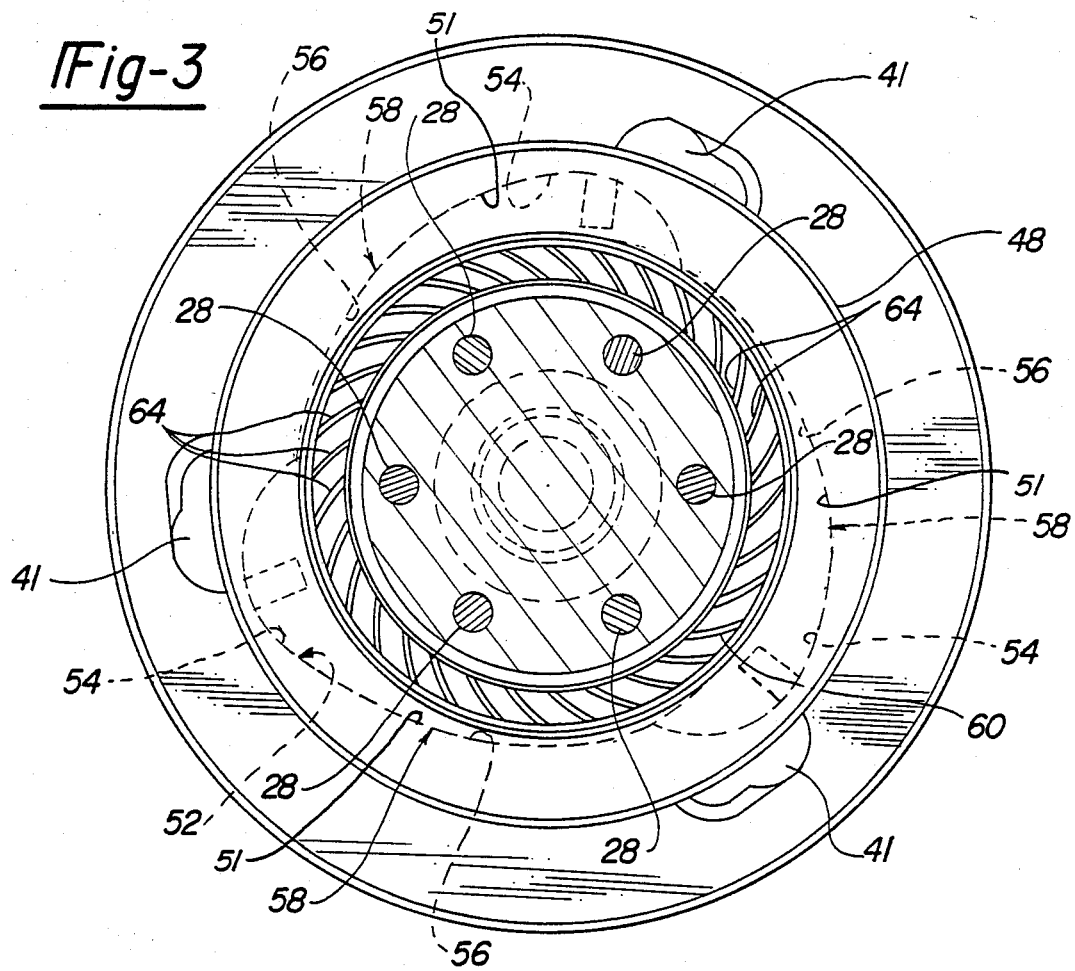
FIG. 3 is a cross-sectional view taken along line 3—3 of FIG. 2.

The shank 34 is received through an aperture 40 formed through the second holder 18. The second holder 18 is affixed to the machining device 14 by means not shown (for example, bolts) passing through a plurality of spaced holes 41 (FIG. 3). The second holder 18 also has at least and preferably 3 pins 42 located in it. A coil spring 44 is disposed about each pin 42 in a recess 45 formed in the body 47 of the second holder 18. A cam ring 48 is disposed around the pins and coil springs to retain them in the recesses 45 in the body 47. The cam ring 48 is retained on the body 47 by a lock ring 50, or by other means. Thus, the cam ring 48 and the pins 42 are allowed to a float with respect to the aperture 40.

Figure 2:
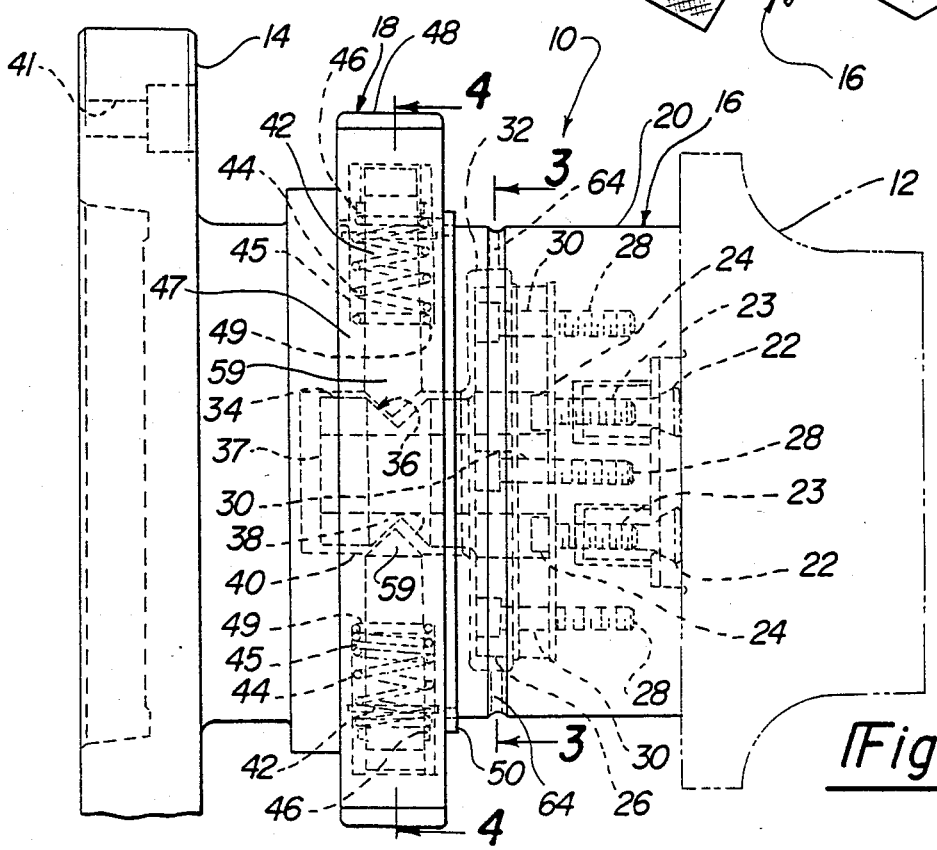
FIG. 2 is a partial phantom view of the preferred embodiment of the present invention.
Figure 4:
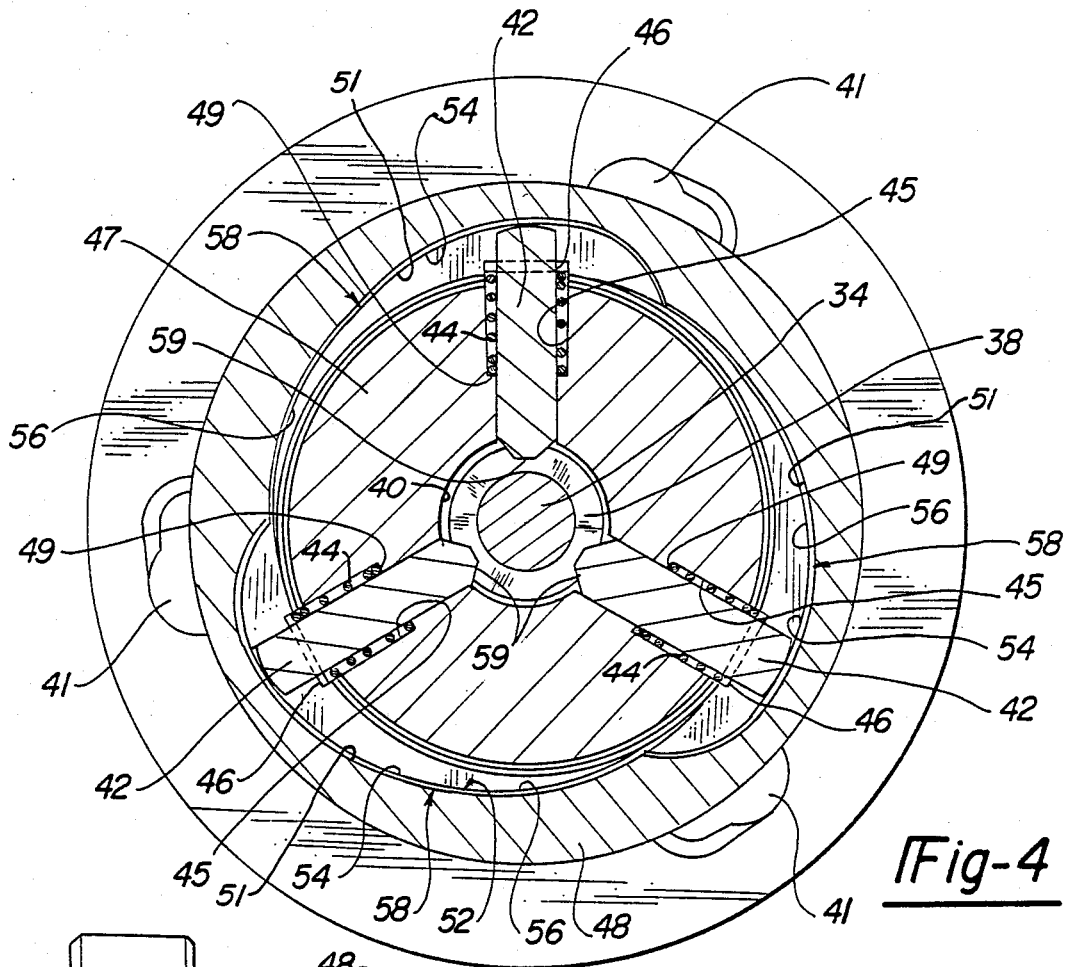
FIG. 4 is a cross-sectional view taken along line 4—4 of FIG. 2.

Still with reference to FIG. 2, but as more clearly shown in cross section in FIG. 4, movement of the pins 42 is permitted by abutment of the coil springs 44 against a shoulder 49 in the recesses 45 of the body 47 of the second holder 18, as well as shoulders 46 formed on the exterior of the pins 42. For example, the shoulders 46 can be formed by washers or the like, or made integral with the pins 42. Movement of the pins 42 is limited by abutment of the rounded heads of the pins 42 against a cam surface 52 formed in the cam ring 48. The cam surface 52 is split into a single surface portion 51 for each of the pins 42, and the portion 51 comprises a pair of cam ring segments 54 and 56 which are abutted by the heads of the pins 42.

The radially outermost cam surface segment 54 possesses a camber of preferably between 3 and 5 degrees, but optimally about 3 degrees. The radially inner cam surface segment 56 has somewhat less camber, preferably about 1 to 3 degrees, and optimally about 1 and ½ degrees.

The cam surface segments 54 and 56 are smoothly and continuously merged at locations 58. The locations 58 at which the cam surface segments 54 and 56 merge are positioned such that, when the pins abut the cam surface 52 at such locations 58, the pins are at most loosely engaged with the ramp surface 36 of the shank 34; that is, the inner ends 59 of the pins 42 may extend somewhat into the V-notch 38 of the shank 34 but do not engage the shank 34 with sufficient force to lock it in position.

Thus, rotation of the cam ring 48 in, for example, a clockwise direction as shown in FIG. 4, causes the pins 42 to move radially inwardly in the V-notch 38, riding along the ramp surface 36 of the shank 34, thereby drawing the shank 34 towards the second holder 18. Rotation of the cam ring 50 in a counterclockwise direction permit radially outward movement of the pins 42, so as to release the shank 34 from the second holder 18.

Figure 5:
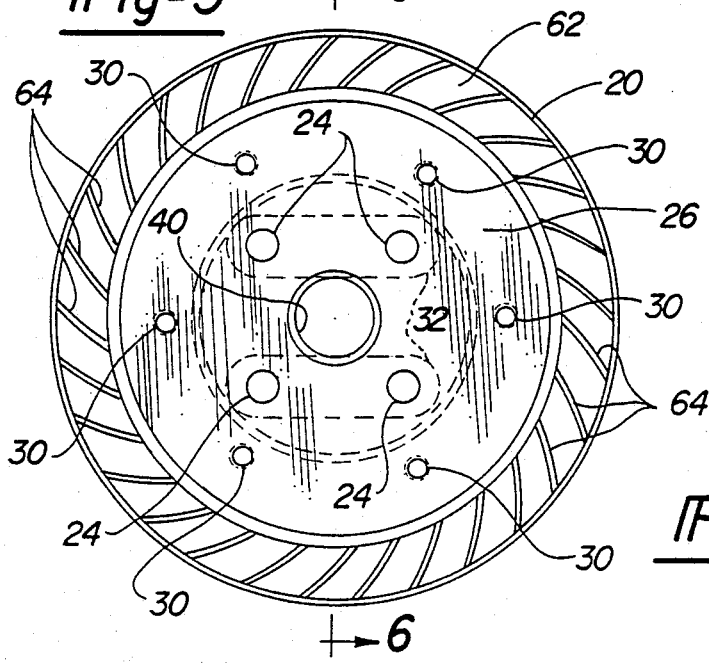
FIG. 5 is an elevational view of a portion of the preferred embodiment of the present invention.

It should be evident that the cam ring 48 and the pins 42 thus float with respect to the holders 16 and 18 as well; that is, they are not retained in any radially fixed position with respect to the holders 16 and 18. Instead, alignment of the holders 16 and 18 is brought about by the engagement of a pair of abuttable helical face gears 60 (FIG. 5) and 62 (FIG. 3) formed on facing mating surfaces of the first and second holders 16 and 18, respectively. It is the teeth 64 (FIG. 6) of these face gears 60 and 62 which abut and engage one another to precisely align the holders 16 and 18, when the cam ring 48 is rotated. The preferred gears 60 and 62 of the present invention each include thirty-two teeth. The ramp surface 36, the cam ring 48 the pins 42 and the shoulders 46 thus serve as a draw means for drawing the shank 34 towards the second holder 18, bringing about engagement of the face gears 60 and 62, thereby precisely positioning the holders 16 and 18 with respect to one another, and consequently precisely aligning the working member 12 with respect to the machining device 14.

Again, the gears 60 and 62 are configured in the same fashion as the gear 10 of U.S. Pat. No. 2,696,125, one of them being reverse threaded from the other, so as to mesh in face to face engagement. Such paired construction is also shown in FIGS. 1 through 3 of U.S. Pat. No. 4,307,797. Typically, when employing face gears dimensioned generally as shown in the figures, and being, for example, about 5 inches across in diameter, repeated attachment of the working member 12 to the machining device 14 can achieve a precision of about one or two ten-thousandths of an inch. This is a substantial improvement over the precision usually obtained with machining tools of this size.

Figure 7:
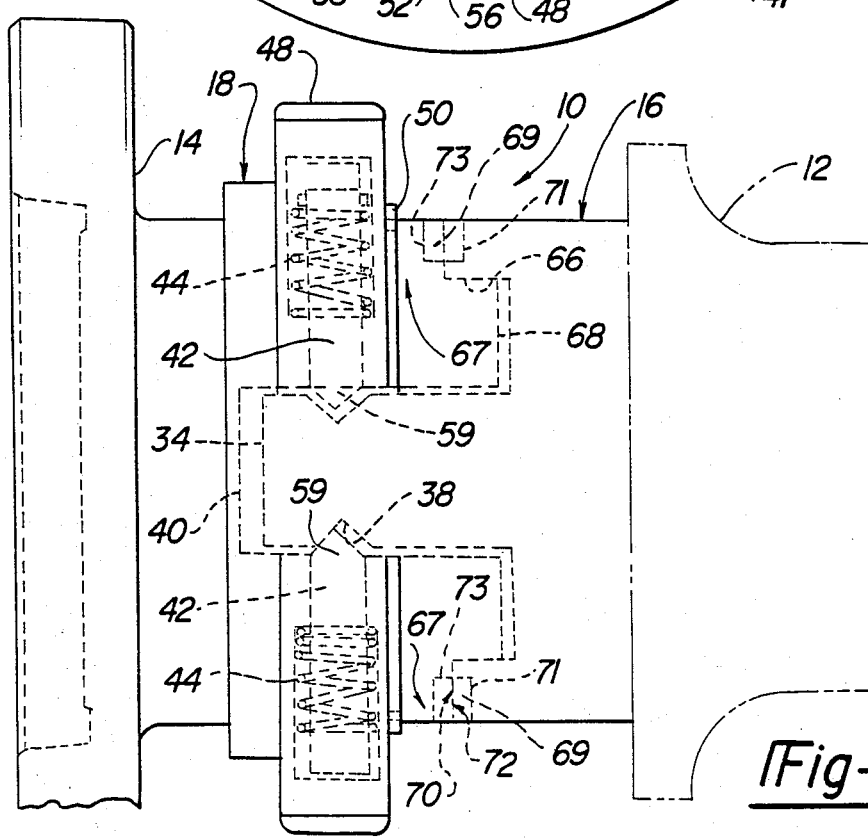
FIG. 7 is a schematic, partial phantom view of another preferred embodiment of the present invention, a view comparable to FIG. 2.

An alternative way of achieving such precision is to replace the face gears 60 and 62 and the associated surfaces of the holders 16 and 18 with a pilot and counterbore, or cylindrical stud and recess combination, as shown in FIG. 7. More specifically, the first engagement portion of the first holder 16 can alternatively include a counterbore or cylindrical recess 66 formed about the shank 34. The second engagement portion of the second holder 18 includes a pilot or cylindrical stud 68 extending from the surface of the second holder 18, the aperture 40 which receives the shank 34 being formed longitudinally through the stud 68. The recess 66 is at least laterally dimensioned so as to closely receive the cylindrical stud 68 in it, preferably to a tolerance of a few ten-thousandths of an inch. The pilot or stud 68 fits closely into the recess or counterbore 66 in order to minimize radial run-out.

The adapter 10 of this embodiment additionally comprises key means 67 preventing rotation of the stud 68 with respect to the recess 66 when the cam ring 48 is actuated so as to cause the pins 42 to ride on the ramp surface 36 and draw the shank 34 towards the second holder 18, thereby bringing the first holder into engagement with the second holder 18. The key means 67 can comprise a flat key 69 fitting in correspondingly dimensioned slots 71 and 73 formed in the holders 16 and 18. Other key means known in the art can be employed as well.

Each of he first and second holders 16 and 18 also includes a planar, annular flange or mating surface 70 or 72, respectively, located around the cylindrical stud 68 and the cylindrical recess 66. These annular flanges 70 and 72 are precisely milled or ground and preferably polished so as to provide precise flat shoulders abutting against one another, thereby ensuring substantially coaxial alignment of the holders 16 and 18. Such alignment is also brought about by the close lateral tolerance between the cylindrical stud 68 and the cylindrical recess 66. This alternative embodiment of the present invention is of course shown only schematically in FIG. 7, the remaining details being the same as in the embodiment disclosed in FIGS. 1-6.

The alternative preferred embodiment of the present invention allows achievement of similar precision of positioning of the first holder 16 (and working member 12) with respect to the second holder 18, and thereby the machining device 14, as compared to the first preferred embodiment. Similar to the first preferred embodiment, such attachment and detachment occurs by rotation of the cam ring 48, thereby moving the pins 42 into and out of engagement with the ramp surface 36 of the shank 34, drawing the shank 34 into the aperture 40 or releasing the shank 34 from the aperture 40.

Operation of the adapter 10 has already been described with respect to its construction and such details need not be repeated here.

The present invention is advantageous over prior adapters in several ways. The simplicity of construction of the mating surfaces allows greater precision in operation because dirt, grit, chips, grindings and the like, normally present in the shop environment, can be more easily removed during cleaning of the adapter parts. Less dirt is retained in the parts, so there is less material to cause misalignment of the mating surfaces, improving positioning of the working member 12 with respect to the machining device 14. The provision of two segments on each cam surface section provides an optimal compromise between rapid operation and firm affixment of the first and second holders. Of course, the particular abutment surfaces provided can be very precisely formed, and the holders can be accurately and fixedly prepositioned with respect to the working member 12 or the machining device 14, so that alignment of the holders 16 and 18 with the attached working member 12 or machining device 14 can be precisely achieved and readily maintained. Indeed, alignment or gauging can be performed in the tool room instead of at each operation location. Since the holders are not detached from their associated tool or machining device, proper orientation of them is assured throughout use, and the need for a job setter at each operation location is eliminated.

Having described my invention, however, many modifications thereto will become apparent to those skilled in the art to which it pertains, without deviation from the spirit of the present invention, as defined by the scope of the appended claims.

I claim:

1. A quick-change adapter for affixing and precisely locating a working member such as a tool, a workpiece or the like upon a machining device, comprising:
   a first holder having a first surface including a first engagement portion:
   a second holder having a second surface including a second engagement portion and a portion defining an aperture through said second surface;
   a first means for affixing one of said working member and said machining device to said first holder;
   second means for affixing the other of said machining device and said working member to said second holder;
   a shank on said first holder extending from said first surface and dimensioned to be received in said aperture in said second surface; and
   means connected to said second holder for drawing on said shank so as to bring said first and second engagement portions into firm abutment against one another;
   wherein said first and second engagement portions are configured as helical face gears;
   wherein said shank includes an end opposite said first holder and a ramp surface tapering radially inwardly in the direction of an axis of said shank from said end and towards said first holder; and wherein said drawing means comprises at least three pins disposed on said second holder around said aperture and movable therein, each of said pins being abuttable against said ramp surface of said shank; and
   wherein said drawing means further comprises means on said second holder for biasing said pins away from said ramp surface of said shank, and a radially floating cam ring carried by said second holder disposed around said pins and said aperture, said cam ring including a cam surface against which said biasing means biases said pins;

said second holder including a first facing portion facing towards said cam ring and said cam ring including a second facing portion opposite said first facing portion and radially spaced from said first facing portion, whereby rotation of said cam ring about said second holder causes said pins to abut said ramp surface of said shank while said cam ring is free to move radially with respect to said second holder during such rotation.

2. The invention according to claim 1, wherein said first and second affixing means each comprise threaded bolts passing through said holders and matchingly threaded recesses in said working member and said machining device receiving said threaded bolts therein.

3. The invention according to claim 1, wherein said cam surface is dimensioned so that rotation of said cam ring in a first direction moves said pins towards said shank axis, and rotation of said cam ring in a second direction opposite said first direction allows said biasing means to move said pins away from said shank axis.

4. The invention according to claim 3, wherein said cam surface includes a cam surface portion for each of said pins, and wherein each of said cam surface portions has two smoothly merged segments, one of said segments having a greater camber than the other of said segments.

5. The invention according to claim 4, wherein said segments of each of said cam surface portions merge at locations such that, when said pins abut said cam surface at such locations, said pins are at most loosely engaged with said ramp surface of said shank.

6. The invention according to claim 4, wherein the camber of said one of said segments is about three degrees, while the camber of the other of said segments is about one and one-half degrees.

7. The invention according to claim 4, wherein said one of said segments is located more radially outwardly than said other of said segments.

8. The invention according to claim 1, wherein said biasing means comprises a coil spring disposed around each of said pins.

9. The invention according to claim 8, wherein each of said pins and said second holder include shoulders against which said springs abut.

10. The invention according to claim 1, wherein said ramp surface of said shank extends sufficiently both along and radially to said axial direction of said shank so that said first and second engagement portions of said first and second holders firmly abut one another while said pins abut said ramp surface.

* * * * *